Patented Apr. 27, 1926.

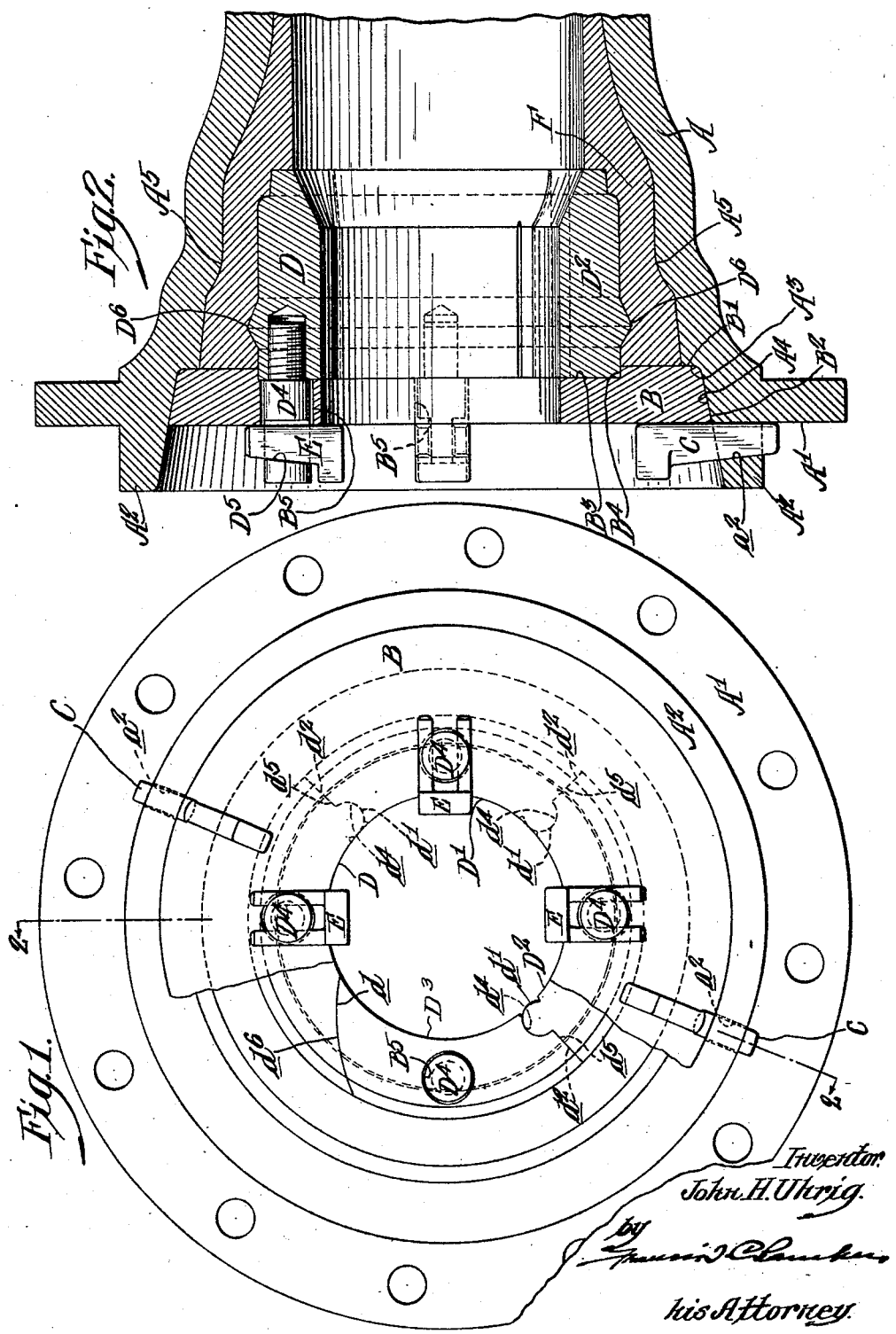

1,582,440

UNITED STATES PATENT OFFICE.

JOHN H. UHRIG, OF BEVERLY, NEW JERSEY, ASSIGNOR TO UNITED STATES CAST IRON PIPE AND FOUNDRY COMPANY, OF BURLINGTON, NEW JERSEY, A CORPORATION OF NEW JERSEY.

SOCKET CORE FOR PIPE MOLDS.

Application filed August 19, 1924. Serial No. 732,916.

*To all whom it may concern:*

Be it known that I, JOHN H. UHRIG, a citizen of the United States, residing in Beverly, in the county of Burlington and State of New Jersey, have invented a certain new and useful Improvement in Socket Cores for Pipe Molds, of which the following is a true and exact description, reference being had to the accompanying drawings, which form a part thereof.

My invention relates to the socket cores used in connection with pipe molds for casting the bell ends of pipes and is especially intended and adapted for use in connection with a centrifugal pipe mold, although, of course, it can be used with any pipe mold. The object of my invention is to provide a special form of collapsible segmental socket core in which, in the collapsing of the core, the inward movement of the individual segments may be a bodily movement of the segments in a line perpendicular to the axis of the core, and also to provide for an interengagement of the abutting ends of the segments which will in assembled position go far to assure the correct alignment of the segments assembled to form the core.

I am not the inventor of what, broadly speaking, may be described as a segmental collapsible socket core for use in connection with centrifugal pipe molds, this particular invention, so far as I know, being original with Edward Hering and described in connection with his patent application filed September 6th, 1924 Serial Number 736,221.

The nature of my invention in the best form in which I have adapted it for use will be understood as described in connection with the drawings in which—

Figure 1 is an end view of a centrifugal pipe mold equipped and ready for use in connection with my improved collapsible socket core device and Figure 2 is a section on the line 2—2 of Fig. 1.

A indicates the pipe mold having a flanged outer end $A^1$ from which extends an annular flange $A^2$ formed at convenient intervals with wedge receiving openings indicated at $a^2$. The end of the mold shown is that in which the bell end of a pipe is cast and it is formed to receive a socket ring B which fits against the abutments formed in the end of the mold and indicated at $A^3$ and $A^4$. $A^5$ indicates the bell shaped end of the mold, B is the socket ring having abutting surfaces $B^1$ and $B^2$ which fit against the surfaces $A^3$ and $A^4$; the socket ring having, inside of the surface which serves as the outer end of the mold, a core receiving bearing indicated at $B^3$ and $B^4$, the wall $B^4$ being circular in shape. $B^5$ $B^5$ etc., indicate openings formed through the socket ring for the purpose to be described. C C are wedges which after the socket ring is in place in the end of the mold are driven into the small wedge openings $a^2$ to hold the ring in place. D, $D^1$, $D^2$ and $D^3$ are socket core segments which, when assembled together, form an annular socket core. As shown, the abutting ends of the assembled segments, with one exception, are formed to interengage with each other and properly align the segments and also so that one segment, $D^3$ for example, can turn inward on the interengaged surface of the adjacent segments $D^2$. This is provided for by forming a pivot joint between the segments by means of a segmental cylinder $d^1$ formed on one segment and a cylindrical bearing surface $d^4$ formed on the abutting segment. Outside of these contacting cylindrical surfaces the joint between the abutting ends of the segment is made up of the plane surfaces $d^2$ $d^5$.

In order to enable the segments to be moved inward toward the centre of the mold so as to collapse the annular core I form one of the abutting joints between the segments of non-interengaging lapping surfaces such as are indicated at $d$ and $d^6$ forming a tight joint between the segments D and $D^3$.

$D^4$, $D^4$ etc., indicate studs extending outward from the rear ends of the segments D, $D^1$ etc., and, as shown, provided with wedge slots indicated at $D^5$. These studs extend through the openings $B^5$ in the socket ring B and when assembled with the ring the segments are firmly secured to the ring by means of wedges E driven into the wedge opening $D^5$.

F indicates the cast pipe.

In operation the core segments are assembled to form an annular core, as shown in Fig. 1, on their studs, the segments fitting in the bearing surfaces $B^3$ and $B^4$ of the ring B and being firmly clamped in position on the ring by the engagement with the studs $D^1$ and the wedges E. The ring B is then inserted in the end of the mold and secured thereto by the wedges C C or any other convenient fastening devices. The molten metal is then poured into the revolving mold, forming between the end of the mold and socket core of the bell end which may have the groove formed by the outwardly extending rib $D^6$ of the socket core. When the casting is complete, the fastening devices, the wedges C and E, are removed and then the socket ring B can be removed from the end of the mold and from the ends of the segments. Following this the socket core can be collapsed by rotating the segment $D^3$ inward on its pivotal joint with the segment $D^2$, this movement being permitted by the non-interengaging lap joint which it forms with the segment D. After the removal of the segment $D^3$ the other segments of course can readily be moved inward and withdrawn from the casting.

The interengaging form of the core segments are not of vital importance, all that is necessary being that the interengaging surfaces should be such as will permit the segments to be moved inward to collapse the core.

Having now described my invention, what I claim as new and desire to secure by Letters Patent is,

1. A socket core for pipe molds comprising a multiple series of segments adapted when assembled to form an annular socket core, said segments having abutting ends which interengage and properly align the segments in assembled position and two of the segments having a non-interengaging lap joint at their abutting ends in combination with a socket ring and detachable means for securing the separate segments to the socket ring.

2. A socket core for pipe molds comprising a multiple series of segments adapted when assembled to form an annular socket core, said segments having abutting ends which interengage and properly align the segments in assembled position and two of the segments having a non-interengaging lap joint at their abutting ends in combination with studs extending from the rear ends of the segments, a socket ring and detachable means for securing the separate segments to the socket ring by means of the studs extending from the segments.

JOHN H. UHRIG.